Feb. 9, 1971   P. MUNDT ET AL   3,562,074
APPARATUS FOR JOINING AND SUBSEQUENTLY STACKING
THE PARTS OF A SLIDE FRAME
Filed April 22, 1968
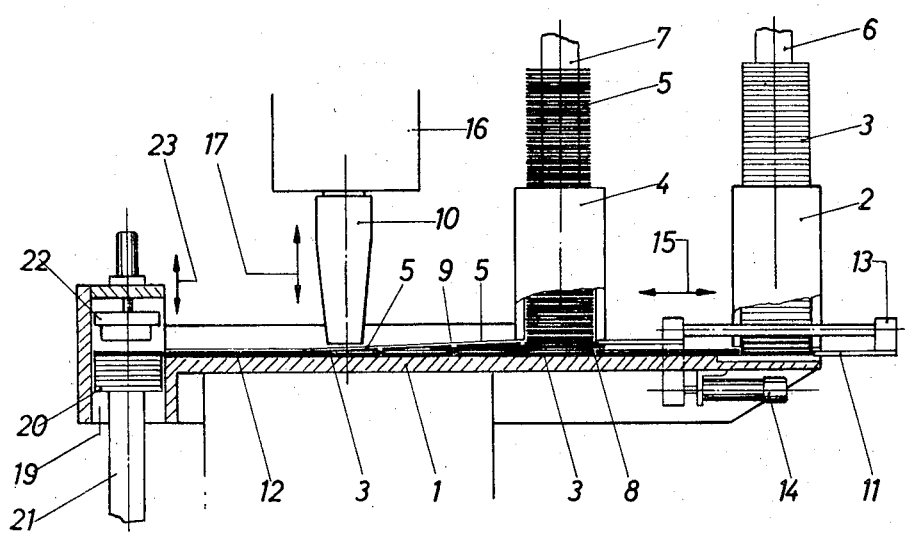
INVENTORS
PETER MUNDT
OTFRIED URBAN
ARNOLD NEUHOLD
By  Stevens, Davis, Miller & Mosher
ATTORNEYS 3,562,074
APPARATUS FOR JOINING AND SUBSEQUENTLY STACKING THE PARTS OF A SLIDE FRAME
Peter Mundt, Garmisch-Partenkirchen, Otfried Urban, Kochel am See, and Arnold Neuhold, Garmisch-Partenkirchen, Germany, assignors to GEIMUPLAST Peter Mundt KG.
Filed Apr. 22, 1968, Ser. No. 723,070
Claims priority, application Germany, Apr. 28, 1967, P 15 72 658.6
Int. Cl. B29c 27/08; B32b 31/20
U.S. Cl. 156—580                               3 Claims

ABSTRACT OF THE DISCLOSURE

An apparatus for weld-joining a base and cover of a slide frame of plastics material and for threading the welded frames on handling and centering rods comprises separate feed wells for the base and cover, respectively. A lower guideway for the base and an upper guideway for the cover extend from the respective wells and join under the welding horn. Interconnected gates are associated with the respective feed wells.

---

This invention relates to an apparatus for weld-joining a base and a cover of a slide frame of plastics material and for aligning the welded frames on handling and centering rods.

The market previously held by the cardboard slide frame can be conquered by the slide frame of plastics material only if the costs of manufacturing the latter can be much reduced. In this respect, the joining of the two parts of a slide frame of plastics material involves also a technological problem. The known slide frames which consist of plastics material and in which the two parts are mechanically joined by snap fasteners cannot compete with the cardboard slide frame because the transparency must be inserted with the aid of expensive mounting machines before the two unfolded parts are joined.

It is also known to join the two parts of a slide frame of plastics material in such a manner that the base is provided with rivets and the cover with corresponding bores and the rivets are set under pressure applied by heated punches. This process is unsatisfactory particularly because only about twenty slide frames can be riveted per minute.

It has been disclosed only in the literature that the two parts of a slide frame of plastics material can be joined by welding. This process has found no commercial acceptance, probably because it has not been possible before to develop an apparatus which enables an adequate utilization of the expenditure required to perform a welding process. Besides, the welding of the plastics materials concerned is by no means unproblematic.

It is an object of the invention to provide an apparatus which is of the kind described initially hereinbefore and has such a high output capacity that the slide frame of plastics material can now compete with the inexpensive cardboard slide frame.

In an apparatus of the kind defined, the above object is accomplished according to the invention in that it has separate feed wells for the base and cover, respectively, a lower guideway for the base and an upper guideway for the cover extend from the respective wells and join under the welding horn (sonotrode), each feed well has associated with it a gate, and said gates are interconnected. When the gates are properly adjusted relative to each other, a base from the feed well which is more remote from the ultrasonic welding horn and a cover from the other feed well can be pushed into the respective guideways and can be advanced by succeeding parts in such a manner that the cover is exactly centered in the base under the welding horn. In an apparatus having only two juxtaposed guideways of each kind and one ultrasonic welding horn of adequate width, one hundred welding operations, corresponding to 200 frames, and more can be performed per minute.

Whereas high frequency welding has not been satisfactorily accomplished for the present purposes, it has been found that ultrasonic welding can be performed with satisfactory results. The ultrasonic welding horn produces ultrasonic welding vibrations, which impart vibration also to the cover so that a high friction is produced between the two parts of the slide frames, and said high friction finally plasticizes junction ribs of the base to produce a homogeneous joint between the two frame parts.

To enable a full utilization of the output capacity of the apparatus, it is another feature of the invention that a centering well having an enlarged lower portion is provided at the end of the common guideway and contains a pressure ram above the guideway. As a result, the interconnected slide frames will be automatically held in the centering well even during a replacement of the handling and centering rod on which the slide frames are usually threaded. Hence, the apparatus need not be shut down when a new handling and centering rod is to be inserted into the centering well. Besides, it is sufficient simply to push the handling and centering rod into the picture apertures of the slide frames so that a fixation of the rods on the apparatus is required only at the other end of the rods.

One embodiment of the invention will be described hereinafter by way of example with reference to the drawing, in which the single figure shows the apparatus partly in side elevation and partly in section.

A base frame 1 carries a feed well 2 for bases 3 and a feed well 4 for covers 5. The bases 3 and covers 5 are threaded on respective handling and centering rods 6 and 7. To prevent a canting interengagement and ensure an exactly parallel threading particularly of the bases 3, which are preferably provided with a peripheral edge lip, the bases are provided at four symmetrical points with small stop cams.

A lower guideway 8 for the bases 3 extends from the feed well 2. An upper guideway 9 for the covers 5 extends over the guideway 8 from the feed well 4 for the covers 5. The two guideways 8, 9 join under an ultrasonic welding horn 10 so that the cover 5 is centered in the base 3 under the welding horn 10.

This synchronous feeding of the base 3 and cover 5 is ensured by the selection of the proper distances from each of the feed wells 2, 4 to the other and to the horn 10 and by the control ssytem, which will be subsequently described. Gates 11 and 12 are respectively associated with the feed well 2 and the feed well 4. The two gates 11, 12 are connected to a constraining linkage 13, which can be reciprocated by a hydraulic cylinder in the direction of the arrow 15. Once the correct adjustment has been attained, the joint actuation of the gates 11, 12 ensures a satisfactory operation of the apparatus in such a manner that the cover 5 is properly centered in the base 3 under the horn 10. The horn 10 is moved up and down in the direction of the arrow 17 by means of a commercially available ultrasonic welding machine 16.

The slide frames which have been joined by ultrasonic welding are advanced by the succeeding bases 3 and previously joined slide frames in a common guideway 18 to a centering well 19. Below the common guideway 18, the centering well 19 is first dimensioned so that it firmly encloses the slides frames and frictionally keeps them from falling by gravity out of the centering well 19, which has an enlarged lower portion. The free end of a handling and centering rod 21 is inserted into the picture apertures of the joined slide frames 20 which are held in the centering well 19. To release the slide frames in the centering well 19 so that they are held in the enlarged portion of said well only by the handling and centering rod 21 on which they are stacked, a pressure ram 22 is disposed above the common guideway 18 and can be hydraulically reciprocated in the direction of the arrow 23. An actuation of the pressure ram 22 will thus cause a release of the slide frames 20 from the centering action of the centering well 19 and a pushing of said frames onto the handling and centering rod 21. The apparatus can thus be operated continuously even during a replacement of a handling and centering rod 21 fully set with slide frames. The joined slide frames 20 are held in the centering well 19 during this time.

What is claimed is:

1. Device for weld-joining a base and a cover layer to form a plastic slide frame which comprises a feed well in which a plurality of cover layers is stacked and a second feed well in which a plurality of base layers is also stacked, each well having a separate guide path adjoining the bottom of said well, said guide paths being arranged in planes lying one above each other and terminating at a point so that a base and cover layer arrive in superposed position, an ultrasonic welding device disposed near the termination of said guide path where said layers become superposed to form a slide by adhering said layers to each other, two gates each associated with one of said wells which act to push the layers to be welded into said guide paths and by the welding horn and a receiving shaft which is located near said wells whereby the formed slides are collected.

2. An apparatus according to claim 1, characterized in that the two gates (11, 12) are connected to a constraining linkage (13), which is reciprocable by means of a single hydraulic cylinder (14).

3. An apparatus according to claim 1, characterized in that a centering well (19) is disposed at the end of a common guideway (18) and has an enlarged lower portion and contains a pressure ram (22) above the guideway (18).

References Cited
UNITED STATES PATENTS

| | | | |
|---|---|---|---|
| 3,001,570 | 9/1961 | Paxton | 156—573X |
| 3,006,802 | 10/1961 | Pfeffer, Jr. | 156—380 |
| 3,291,669 | 12/1966 | Osher | 156—73 |

BENJAMIN A. BORCHELT, Primary Examiner

J. J. DEVITT, Assistant Examiner

U.S. Cl. X.R.

156—73; 228—1